United States Patent [19]

Takimoto et al.

[11] Patent Number: 4,924,326
[45] Date of Patent: May 8, 1990

[54] SIGNAL REPRODUCING APPARATUS

[75] Inventors: Hiroyuki Takimoto; Kenichi Nagasawa; Mikihiro Fujimoto; Hiroyuki Kobayashi; Masahiro Takei, all of Kanagawa, Japan

[73] Assignee: Canon Kabushiki Kaisha, Tokyo, Japan

[21] Appl. No.: 198,706

[22] Filed: May 17, 1988

Related U.S. Application Data

[63] Continuation of Ser. No. 772,767, Sep. 5, 1985, abandoned.

[30] Foreign Application Priority Data

Sep. 7, 1984 [JP] Japan ................................. 59-187317
Sep. 7, 1984 [JP] Japan ................................. 59-187318
Sep. 7, 1984 [JP] Japan ................................. 59-187319
Sep. 7, 1984 [JP] Japan ................................. 59-187320

[51] Int. Cl.$^5$ .................... H04N 5/783; G11B 21/10
[52] U.S. Cl. .................................. 360/10.2; 360/10.3; 360/70; 360/73.04; 360/77.14
[58] Field of Search .................. 360/10.2, 10.3, 70, 360/74.4, 10.1, 73.04, 73.05, 73.09, 73.11, 77.13, 77.14, 77.15

[56] References Cited

U.S. PATENT DOCUMENTS

| 4,190,869 | 2/1980 | Ota ..................................... 360/10.2 |
| 4,280,146 | 7/1981 | Misaki et al. ....................... 360/10.2 |
| 4,428,004 | 1/1984 | Mino ................................... 360/10.2 |
| 4,568,986 | 2/1986 | Furuhata ........................... 360/10.2 |

Primary Examiner—Aristotelis M. Psitos
Attorney, Agent, or Firm—Toren, McGeady & Associates

[57] ABSTRACT

An apparatus for reproducing recorded signals by periodically tracing with reproducing heads many recording tracks formed on a record bearing medium, is arranged to form from the output of the reproducing head a first periodic signal relative to a tracking error between the head and one of many recording tracks; and to control the movement of the record bearing medium relative to the reproducing head on the basis of a phase difference between the first periodic signal and a second periodic signal which is related to the tracing period of the reproducing head.

20 Claims, 6 Drawing Sheets

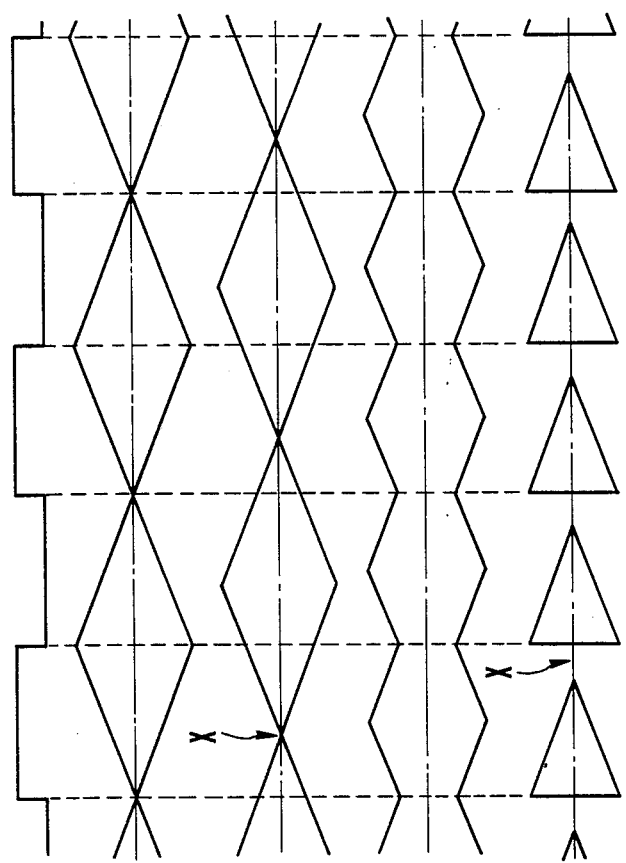
FIG.2(a) FIG.2(b) FIG.2(b') FIG.2(c) FIG.2(c')

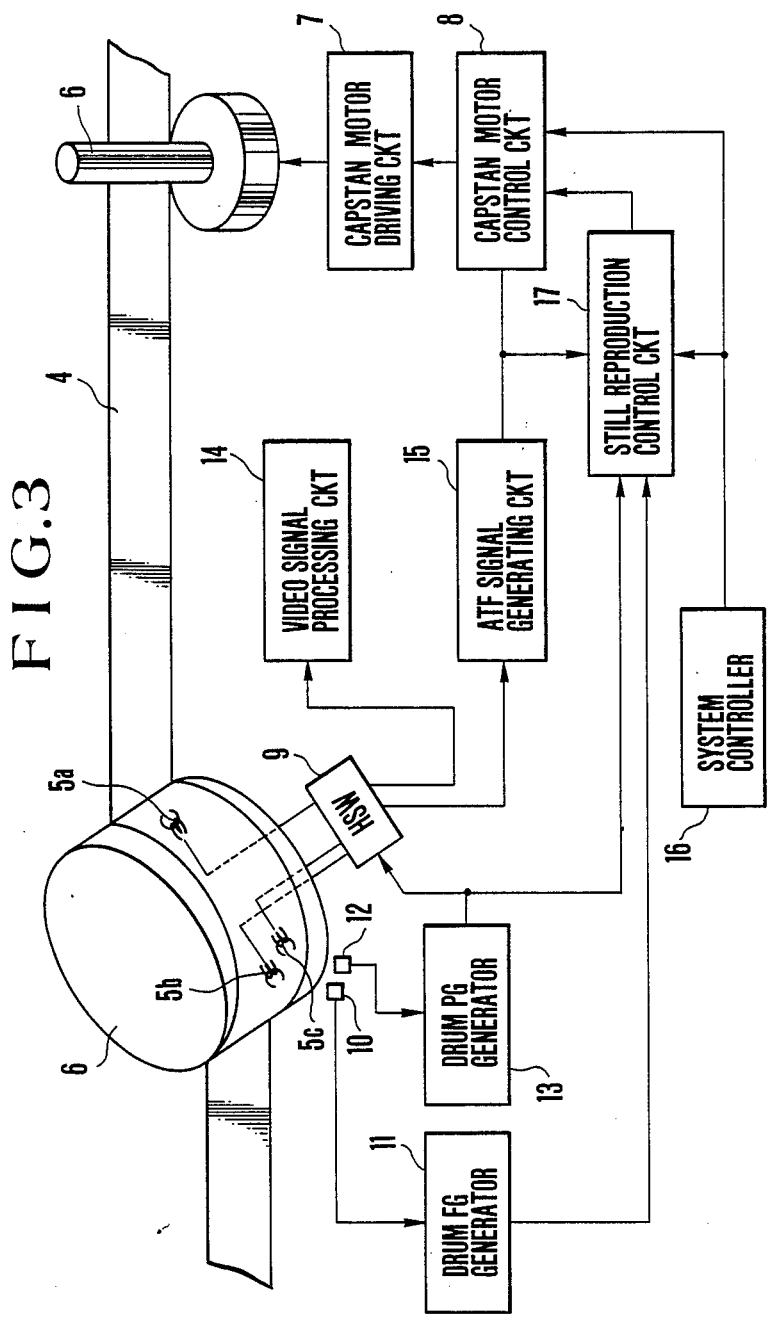

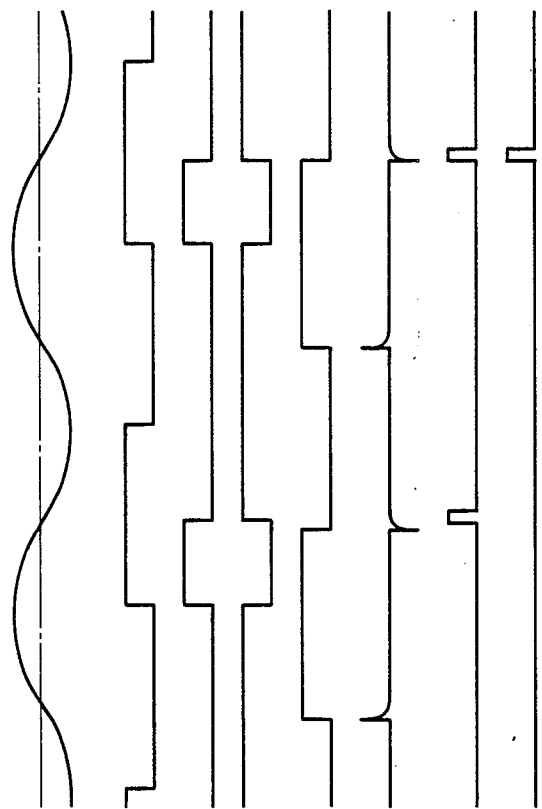
FIG.5(i)
FIG.5(ii)
FIG.5(iii)
FIG.5(iv)
FIG.5(v)
FIG.5(vi)
FIG.5(vii)
FIG.5(viii)

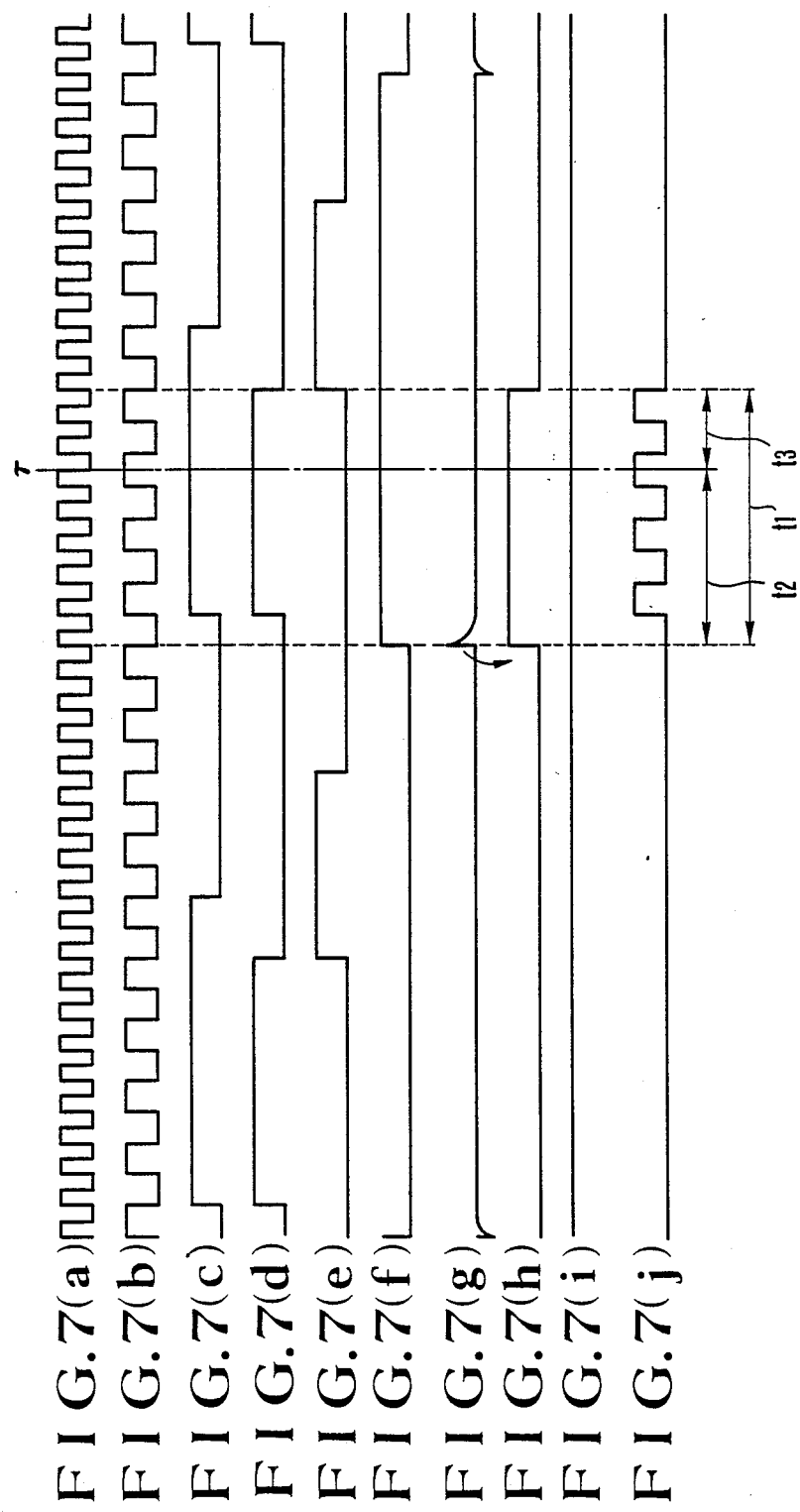

SIGNAL REPRODUCING APPARATUS

This is a continuation of application Ser. No. 772,767, filed Sept. 5, 1985, now abandoned. BACKGROUND OF THE INVENTION 1. Field of the Invention This invention relates to a signal reproducing apparatus and, more particularly, to an apparatus arranged to reproduce recorded signals by periodically tracing with reproducing heads a recording medium on which many recording tracks are formed.

2. Description of the Prior Art

Apparatuses of the above-stated kind include, for example, a video tape recorder (hereinafter will be referred to as a VTR) which is arranged to record and reproduction), a video signal on and from a magnetic tape. This specification describes the present invention as applied to the control of movement of the tape during a still picture reproducing operation of a VTR.

In carrying out a still picture reproducing operation with a VTR (hereinafter referred to as still reproduction), a travelling magnetic tape is brought to a stop. Then, there arises a difference between the inclination nation of the tracing locus of a rotary head and that of video signal recording tracks on the tape. This causes the level of a reproduced signal to come to drop in a fixed cycle. The level drop results in a noise bar appearing on the reproduced picture.

FIG. 1 of the accompanying drawings shows the tracing loci of the rotary heads of a VTR in relation to the recording tracks. Recording tracks 1A, 2A and 3A are formed on a magnetic tape 4 by a first rotary head and recording tracks 1B, 2B and 3B by a second rotary head. The tracks 1A, 2A and 3A are magnetized in a different direction from the magnetizing direction of the tracks 1B, 2B and 3B.

In FIG. 1, a reference symbol LS denotes a tracing locus ideally obtained for reproduction of a still picture by tracing the magnetic tape 4 alternately with the first and second rotary heads. A symbol IS denotes a tracing locus ideally obtained for still picture reproduction by tracing the magnetic tape 4 alternately with the first rotary head and an extra head having the same magnetizing direction as the first rotary head.

FIG. 2 is a waveform chart showing the envelope waveform of a reproduced video signal obtained during still picture reproduction. In this chart, FIG. 2(a) shows a rectangular wave signal of 30 Hz synchronized with the rotation of the rotary head (hereinafter referred to as a 30 PG signal). The rise and fall of the 30 PG signal indicate timing for a start and an end of track tracing by the rotary head. For example, the first rotary head traces a track in 1/60 sec. during which the 30 PG signal is at a high level.

In case that still reproduction is performed according to the ideal tracing locus LS for one frame portion of the video signal (hereinafter referred to as frame still reproduction) by reproducing two field portions of video signal, one field alternately with the other field, the record in the track 1A is reproduced by the first rotary head and the record in another track 1B reproduced by the second rotary head alternately with the track 1A. The envelope waveform of the reproduced signal becomes as shown at FIG. 2(b). In the frame still reproduction, if the tracing locus of the head deviates from the ideal tracing locus LS, there would obtain such a reproduction envelope waveform as shown at FIG. 2(b'). In that event, a signal deterioration part X, which is shown in the drawing, would result in a lateral linear noise line appearing on a reproduced picture.

Meanwhile, in the case of still reproduction which is carried out according to the ideal tracing locus IS using only one field portion of a video signal (hereinafter referred to as field still reproduction), the record in the track 3A is repeatedly reproduced jointly by the first rotary head and the extra head having the same magnetizing direction as the first head. The envelope waveform of a signal thus reproduced becomes as shown at FIG. 2(c). In this case, if the tracing locus of these heads deviates from the ideal tracing locus IS, the waveform of the reproduced signal would become, for example, as shown at FIG. 2(c'). A signal deteriorated part X, which is indicated in the drawing, then results in a stripe-like noise appearing on a reproduced picture.

In order to have the tracing locus of the head coincide with the above-stated ideal tracing locus LS or IS, the tape stopping position must be accurately determined. In the conventional VTR, the tape stopping position has been determined according to reproduced control signals obtained from control signals (hereinafter referred to as CTL signals) which are recorded in the longitudinal direction along one edge portion of the magnetic tape.

However, since the CTL signals are recorded along the edge portion of the tape, it becomes impossible to bring the tape to a stop at an ideal point in the event of a curved video signal recording track. Furthermore, the CTL signal is obtainable only when the reproducing head is reproducing the CTL signal while the tape is moving. Once the tape has come to a stop, it is no longer possible to adjust the stopped position of the tape. Besides, the information borne by the CTL signals is recorded at intervals and is available only in an intermittent manner by reproduction. Therefore, highly precise control over the tape stopping position has been impossible.

In addition to the above-stated problem, the physical properties of a capstan and precision in the mounted position of a CTL signal reproducing head vary among different VTR units. Therefore, it has been impossible to determine a timing for driving and stopping the capstan prior to actual adjustment work on individual units of the apparatus. Further, as apparent from FIG. 1, the ideal stopping position is not alike between frame still reproduction and field still reproduction and this has necessitated use of different circuits for these different modes of still reproduction.

A further problem with the conventional VTR lies in that the arrangement to record the CTL signals along the edge of the tape hinders an attempt to increase recording density. In view of this problem, there have been recently proposed, and put into practice, VTR's of the kind having no CTL signal recorded on the tape.

SUMMARY OF THE INVENTION

Such being the background situation, a general object of this invention is to provide a signal reproducing apparatus which is capable of very accurately grasping the positional relation between a record bearing medium and a reproducing head. It is a more specific object of the invention to provide a signal reproducing apparatus which is capable of very accurately controlling the movement of a record bearing medium.

Under this object, a signal reproducing apparatus, which is arranged, according to this invention as an embodiment thereof, to reproduce from a record bearing medium signals recorded in many recording tracks formed on said medium, comprises: a reproducing head arranged to periodically trace the record bearing medium; means for forming a first periodic signal relative to a tracking error between the reproducing head and one of the many tracks by using the output of the reproducing head; means for forming a second periodic signal relative to the tracing period of the reproducing head; and means for controlling the positions of the reproducing head and the record bearing medium relative to each other on the basis of a phase difference between the first and second periodic signals.

It is another object of this invention to provide a signal reproducing apparatus which is capable of accurately bringing a record bearing medium to a stop at a desired point.

Under that object, a signal reproducing apparatus, which is arranged, according to this invention as a preferred embodiment thereof, to reproduce from a record bearing medium signals recorded in many recording tracks formed on the medium, comprises: a reproducing head arranged to periodically trace the record bearing medium; detecting means for detecting, by using the output of the reproducing head, the deviation of the tracing position of the reproducing head from a predetermined point on the record bearing medium relative to the recording tracks for every tracing period of the reproducing head; and control means for controlling the movement of the record bearing medium, the control means including a circuit arranged to bring the record bearing medium to a stop according to the output of said detecting means.

It is a further object of this invention to provide a signal reproducing apparatus which is capable of accurately controlling the movement of a record bearing medium to a slight extent.

Under this object, a signal reproducing apparatus, which is arranged according to this invention as a preferred embodiment thereof, to reproduce from a record bearing medium signals recorded in many recording tracks formed on the medium, comprises: a reproducing head arranged to trace the record bearing medium; detecting means for detecting, by using the output of the reproducing head, the deviation of the tracing position of the reproducing head from a predetermined point on the record bearing medium relative to the recording tracks when the medium comes to a stop; and moving means for moving the record bearing medium to an extent corresponding to the positional deviation detected by the detecting means.

The above and further objects and features of this invention will become apparent from the following detailed description of preferred embodiments thereof taken in connection with the accompanying drawings.

BRIEF DESCRIPTION OF THE DRAWINGS

FIGS. 2(a) to 2(c') show, in a waveform chart, the envelope waveforms of reproduced signals obtained during still picture reproduction.

FIG. 3 is a schematic view showing the outline of an arrangement of a VTR according to this invention as an embodiment thereof.

FIGS. 5(i) to 5(viii) show in a timing chart the waveforms of signals obtained at various points in the circuit arrangement of FIG. 4.

FIGS. 7(a) to 7(j) show in a timing chart the waveforms of signals obtained at various points in the circuit arrangement of FIG. 6.

DETAILED DESCRIPTION OF THE PREFERRED EMBODIMENTS

Figure 1:
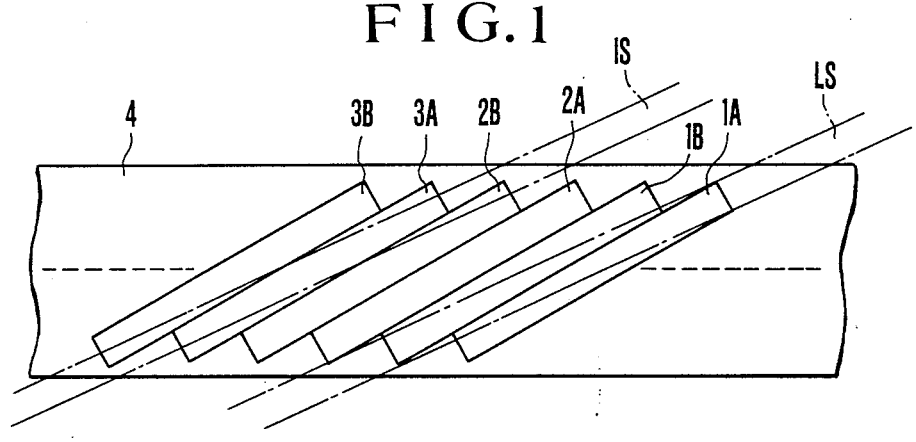
FIG. 1 is an illustration of the tracing loci of heads of a VTR in relation to recording tracks obtained on a record bearing medium.

The following describes some examples of embodiment of this invention with reference to the accompanying drawings:

FIG. 3 schematically shows the arrangement of a VTR according to this invention as an embodiment thereof. Referring to FIG. 3, a magnetic tape 4 is wrapped at least 180 degrees around a rotary drum 6. Heads 5a and 5b, which have different magnetizing directions, are attached to the drum 6 at a phase difference of about 180 degrees. Meanwhile, another head 5c, which has the same magnetizing direction as the head 5a, is also mounted on the drum 6 in the neighborhood of the head 5b. Signals picked up by these heads are made into a continuous signal by a head switching circuit 9 (hereinafter referred to as the HSW circuit).

The continuous signal obtained by the HSW circuit 9 is supplied to a video signal processing circuit 14. The continuous signal is then brought back to its original signal form before it is produced from the circuit 14. In this specific embodiment, the reproduced signal obtained from the heads 5a and 5b is used for ordinary reproduction. In the event of still reproduction, the heads 5a and 5c instead of 5a and 5b are used for obtaining the reproduced signal. An ATF signal generating circuit 15 is arranged to use the reproduced signal obtained from the heads 5a and 5b and to produce a tracking error signal which continuously indicates tracking errors between the head 5a or the head 5b and the video signal recording tracks. The tracking error signal is arranged to be obtained by a known four frequency method (using pilot signals). More specifically, in accordance with the four frequency method, four pilot signals having different frequency values from each other are recorded one after another, one for each recording track, during a signal recording operation. During reproduction, the levels of the pilot signals, obtained by the reproducing head, from two adjacent tracks located before and after a track under control are compared with each other. Then, a result of this comparison is used as a tracking error signal and further as a tracking control signal (hereinafter referred to as an ATF signal).

The ATF signal thus obtained by the ATF signal generating circuit 15 is supplied to a capstan motor control circuit 8. The circuit 8 then controls a capstan 6 via a capstan motor driving circuit 7. Generally, the capstan motor control circuit 8 consists of a phase control loop, which operates using this ATF signal, and a speed control loop which is arranged to keep the rotation speed of the capstan 6 unvarying by detecting the rotation of the capstan 6. However, the details of the circuit 8 is omitted herein.

Meanwhile, a drum PG signal of 30 Hz, which indicates the rotation phase of the drum 6, is obtained from a detector 12 and a drum PG generator 13. The timing for the switching operation of the HSW circuit 9 is controlled by this drum PG signal. Further, a pulse signal of a high frequency (hereinafter referred to as a drum FG signal), which is to be used for detecting the rotation speed of the drum 6 is obtained from a detector 10 and a drum FG generator 11.

Figure 4:
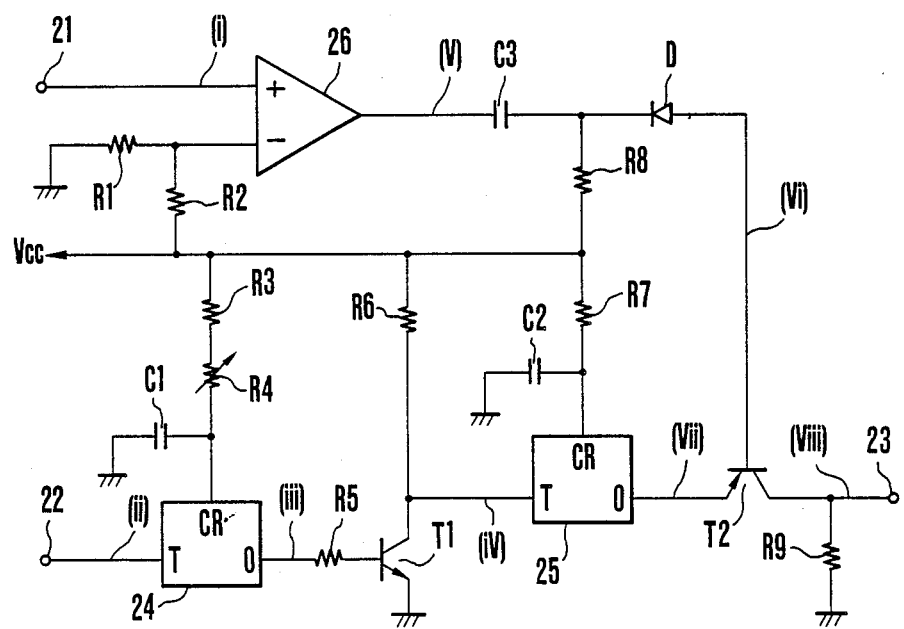
FIG. 4 is a circuit diagram showing, by way of example, the arrangement of a still reproduction control circuit which is shown in FIG. 3.

A still reproduction control circuit 17 is arranged as follows: When a system controller 16 issues an instruction for still reproduction, the capstan 6 is controlled via the capstan motor control circuit 8 with the above-stated drum PG signal and the ATF signal before the still reproduction is actually performed after the issuance of the instruction for still reproduction. The details of the operation of the still reproduction control circuit 17 is as described below:

FIG. 4 shows an example of arrangement of the still reproduction control circuit 17. The illustration includes a terminal 21 to which the ATF signal is arranged to be supplied; a terminal 22 is arranged to receive the drum PG signal; a control output terminal 23; a power supply voltage Vcc; resistors R1 to R9; capacitors C1, C2 and C3; a diode D; transistors T1 and T2; monostable multivibrators 24 and 25; and a comparator 26. FIGS. 5(i) to 5(viii) show, in a timing chart, the waveforms of signals obtained at various points (i) to (viii) in the circuit arrangement shown in FIG. 4. The following describes the operations performed during still reproduction with reference to these drawings:

With the instruction for still reproduction issued from the system controller 16, the control operation by the capstan motor control circuit 8 shifts from a control mode (a first mode) for the above-stated ordinary reproduction to another control mode (a second mode), which is as follows: Concurrent with the still reproduction instruction from the system controller 16, a control signal is supplied to the capstan motor control circuit 8. In response to this control signal, the capstan motor control circuit 8 causes the capstan to rotate at a speed much lower than its rotation speed for ordinary reproduction. The control signal further causes the still reproduction control circuit 17 to begin to operate.

The ATF signal (i), which comes via the terminal 21 as shown in FIG. 4, is supplied to the comparator 26. At the comparator 26, the ATF signal is compared with a voltage which corresponds to an on-track state of the reproducing head. This voltage is obtained by dividing the power supply voltage through the resistors R1 and R2. The output signal (v) of this comparator 26 is supplied to a differentiation circuit which is composed of the capacitor C3, the resistor R8 and the diode D. The differentiation circuit then produces a differential output which is as shown at FIG. 5(vi). Meanwhile, the drum PG signal, which is supplied to the other terminal 22 as a head switching signal (ii), is supplied to the monostable multivibrator 24. The multivibrator 24 is triggered by the rise of the drum PG signal to produce a pulse signal (iii) of a pulse width which is determined by the resistors R3 and R4. The pulse signal (iii) is then inverted into a pulse signal as shown at FIG. 5(iv) by an inverter which consists of the transistor T1 and the resistor R6. This pulse signal (iv) triggers the monostable multivibrator 25 to produce another pulse signal (vii) which is of a pulse width determined by the capacitor C2 and the resistor R7. The above-stated differential output (vi) is supplied to the base of the transistor T2.

Meanwhile, the pulse signal (ii) is supplied to the emitter of the transistor T2. When the phases of these inputs come to coincide with each other, the transistor T2 produces a pulse signal (viii) which is as shown at FIG. 5(viii).

This pulse signal (viii) is supplied via the terminal 23 to the capstan motor control circuit 8 to bring thereby the rotation of the capstan 6 to a stop. This in turn brings the travel of the tape 4 to a stop. Assuming that field still reproduction is being performed with the heads 5a and 5c, the tracing locus of the heads 5a and 5c is to be controlled to become the ideal tracing locus IS which is shown in FIG. 1. More specifically, the resistance value of the resistor R4 is adjusted in such a way as to suitably determine the pulse width of the pulse signal (iii) produced from the monostable multivibrator 24. In this instance, the pulse width is adjusted to 1/120 sec or thereabout. Further, in this instance, if the pulse signal (vii) produced from the monostable multivibrator 25 is arranged to be close to an impulse, the travel of the tape might never come to a stop. To avoid such a trouble, the pulse width of the pulse signal (vii) is determined within a suitable allowable error range.

The VTR which is arranged in the above-stated manner is capable of accurately bringing the record bearing medium to a stop at a desired point without recourse to the CTL signals for obtaining a good still picture signal. Since the tape is caused to travel at a low speed immediately before it comes to a stop, the adverse effect of inertia can be lessened. The unevenness in the physical properties of components (particularly those of the capstan) between one VTR and another can be corrected beforehand by adjusting the variable resistor R4. Unlike in the case of conventional arrangement of VTR's using the CTL signals, the tape can be stopped at an ideal point even in the event of a curved recording track.

Figure 6:
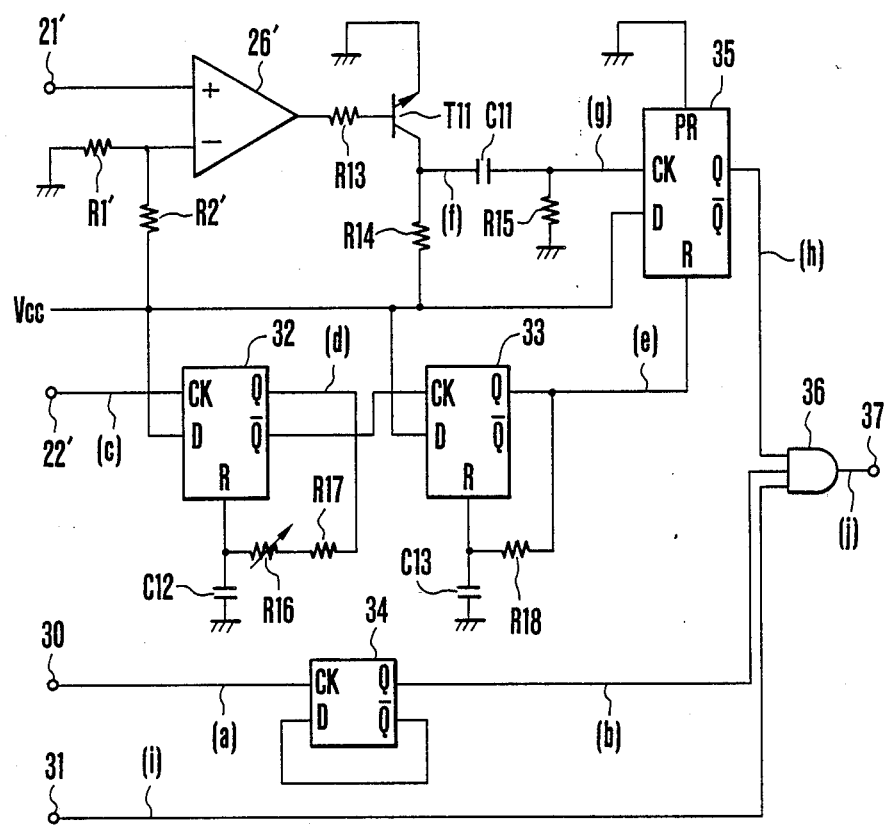
FIG. 6 is a circuit diagram showing another example of arrangement of the still reproduction control circuit shown in FIG. 3.

FIG. 6 shows another example of arrangement of the still reproduction control circuit 17 of FIG. 3. A terminal 21' is arranged to receive the ATF signal. A terminal 22' is arranged to receive the drum PG signal. A terminal 30 is arranged to receive the drum FG signal which is mentioned in the foregoing. Another terminal 31 is arranged to receive a control signal from the system controller 16 giving an instruction to perform still reproduction. The still reproduction control circuit 17 includes a comparator 26'; D type flip-flops 32, 33, 34 and 35 (hereinafter referred to as DFF's); an AND gate 36; and an output terminal 37 which is arranged to produce a capstan driving signal therefrom.

FIGS. 7(a) to 7(j) show, in a timing chart, the waveforms of signals obtained at various points (a) to (j) indicated in FIG. 6. The following describes the operations of the circuit with reference to these drawings:

Upon receipt of the instruction for still reproduction from the system controller 16, the capstan motor control circuit 8 responds to the control signal to shift its control mode from a normal reproduction mode, in which it performs speed control and phase control using the ATF signal, to a control operation performed according to the capstan driving signal which is obtained from the still reproduction control circuit 17. The capstan driving signal generating operation of the still reproduction control circuit 17 is as follows:

The ATF signal is supplied to the terminal 21' shown in FIG. 6. The ATF signal is then supplied to the comparator 26' to be compared with a voltage which corresponds to an on-track state. This voltage is obtained by dividing the power supply voltage by resistors R1' and R2'. The output of this comparator 26' is then supplied via an inverting circuit, which consists of a transistor T11 and resistors R13 and R14, to a differentiation circuit which consists of a capacitor C11 and a resistor R15. The output signal of the inverting circuit is as shown at FIG. 7(f) and that of the differentiation circuit as shown at FIG. 7(g), respectively. The signal (g) produced from the differentiation circuit is supplied to the CK terminal of the DFF 35.

Meanwhile, the 30 PG signal (c), which comes via the terminal 22', is supplied to a monostable multivibrator which includes a DFF 32, a capacitor C12 and resistors R16 and R17. At this monostable multivibrator, a pulse signal (d), which has a pulse width required for bringing the tape to a stop at a desired point, is obtained. The pulse width of this pulse signal (d) is adjustable by means of the variable resistor R16. The $\overline{Q}$ output of the DFF 32 triggers another DFF 33. The DFF 33 is arranged to serve as a monostable multivibrator in conjunction with a capacitor C13 and a resistor R18. The Q output of the DFF 33 is a periodic signal (e) which is as shown at FIG. 7(e).

The DFF 35 is triggered by the rise of the output signal of the above-stated differentiation circuit and is reset by the signal (e) produced from the DFF 33. A signal (control pulse signal) (h) produced from the DFF 35 is supplied to the AND gate 36 and causes the AND gate to open with the still reproduction instruction having been issued. During that period, a pulse signal (driving signal), which is obtained by dividing the frequency of the drum FG signal (a) by half by the DFF 34, is supplied as a capstan driving signal (j) via the AND gate 36 and the terminal 37 to the capstan motor control circuit 8.

Assuming that field still reproduction is being performed with the heads 5a and 5c, the ATF signal is obtained from the signal reproduced by these heads 5a and 5c. In this instance, when the timing at which an ontrack state obtains during reproduction by the head 5a comes to coincide with the mid-point τ of the high level portion of the head switching 30 PG signal (c), the tracing locus of these heads 5a and 5c becomes the ideal tracing locus IS as apparent from FIGS. 2(a)-2(c').

In the case of the embodiment given above, the on-track timing is deviating by a period of time t2 from the timing of the ideal locus as shown in the timing chart of FIGS. 7(a)-7(j). However, the driving pulse signal (b) is arranged to be gated for a period of time t1 which is longer than the period t2 by a length of time t3. This is because of the fact that the capstan 6 is not actually driven within a length of time t3 by the driving pulse signal (b). In view of this, the gating period t1 is obtained by adding the length of time t3 which is a minimum length of time necessary for moving the capstan to the time t2 which corresponds to the phase difference. This arrangement causes the on-track timing to coincide with the mid-point τ and thus allows the heads 5a and 5c to trace the tape according to the ideal tracing locus IS.

The VTR which is arranged as described above is capable of accurately stopping the record bearing medium at a desired stopping point without recourse to the CTL signal, so that a satisfactorily reproduced still picture signal can be obtained. Further, the unevenness in the physical properties existing between one VTR and another (particularly those of the capstan) can be corrected beforehand by adjusting the variable resistor R16. Another advantage of the embodiment lies in that, unlike the conventional VTR using the CTL signals, the tape can be brought to a stop at an ideal stopping point even in the event of curved recording tracks.

In the two embodiments, the field still reproduction using the heads 5a and 5c is carried out by using the ATF signal which is obtained from the signal reproduced by the heads 5a and 5b. However, the invention is n limited to this arrangement. The same function can be carried out by using an ATF signal obtained from signal reproduced by the heads 5a and 5c instead of by the heads 5a and 5b. Further, this invention is of course likewise applicable to a VTR which is arranged to perform frame still reproduction. In that case, for example, the embodiment shown in FIG. 6 may be modified to have the pulse width of the signal (d) produced from the monostable multivibrator which includes the DFF 32, increased by 1/120 sec; or, in the instance of another embodiment shown in FIG. 4, the pulse width of the pulse signal (iii) of the monostable multivibrator may be also increased by 1/120 sec.

What is claimed is:

1. A signal reproducing apparatus, arranged to reproduce from a record bearing medium signals recorded in many recording tracks formed on said medium, comprising:
    (a) a reproducing head arranged to periodically trace said record bearing medium;
    (b) means for forming a first rectangular signal relative to a tracking error between said reproducing head and one of said many recording tracks by using an output of said reproducing head;
    (c) means for forming a second rectangular signal which has a period relative to a tracing period of said reproducing head;
    (d) means for forming a control pulse signal having a pulse width which corresponds to a phase difference between said first and said second rectangular signals, by using at least part of edges of said first rectangular signal and corresponds to a timing of at least part of edges of said second rectangular signal; and
    (e) control means for controlling the positions of said reproducing head and said record bearing medium relative to each other on the basis of said control pulse signal.

2. An apparatus according to claim 1, wherein said control pulse signal forming means includes a flip-flop which is set by one of said first rectangular signal and said second rectangular signal and is reset by the other of said signals.

3. An apparatus according to claim 1, wherein said control means includes moving means for moving said record bearing medium in a direction not parallel with a longitudinal direction of each of said recording tracks.

4. An apparatus according to claim 3, wherein said control means further includes generating means for generating a pulse signal having drive pulses in cycles, each of said drive pulses being operable to move said record bearing medium to a predetermined extent.

5. An apparatus according to claim 4, wherein said reproducing head is a rotating head, and said generating means includes detection means for detecting a rotating speed of said rotating head.

6. An apparatus according to claim 5, wherein said pulse signal has a frequency corresponding to the rotating speed of said rotating head.

7. An apparatus according to claim 4, wherein said control means further includes gate means for gating drive pulses by using said control pulse signal.

8. An apparatus according to claim 1, further comprising phase adjusting means for adjusting the phase of at least one of said first and said second rectangular signals.

9. An apparatus according to claim 8, wherein said phase adjusting means includes a monostable multivibrator and a circuit arranged to change a time constant of said monostable multivibrator.

10. An apparatus according to claim 1, wherein pilot signals having different frequencies from each other are cyclically recorded, one in each of said many recording tracks; and said first rectangular signal forming means is arranged to use said pilot signals as they are reproduced by said reproducing head.

11. An apparatus according to claim 1, wherein each of said tracks on said record bearing medium has video signals of one field recorded thereon.

12. A signal reproducing apparatus, arranged to reproduce from a record bearing medium signals recorded in many recording tracks formed on said medium, comprising:
 (a) a reproducing head arranged to periodically trace said record bearing medium;
 (b) means for forming a first periodic signal relative to a tracking error between said reproducing head and one of said many recording tracks by using an output of said reproducing head;
 (c) means for forming a second periodic signal relative to a tracing period of said reproducing head;
 (d) means for forming a first pulse signal having a pulse width which corresponds to a phase difference between said first and second periodic signals;
 (e) means for generating a second pulse signal having a cycle shorter than that of said first and said second periodic signals;
 (f) gate means for gating said second pulse signal by using said first pulse signal;
 (g) moving means for moving said record bearing medium in a direction not parallel with a longitudinal direction of each of said recording tracks; and
 (h) driving means for driving said moving means in response to said second pulse signal gated by said gate means.

13. An apparatus according to claim 12, wherein said reproducing head is a rotating head, and said second pulse signal has a cycle corresponding to a rotating speed of said rotating head.

14. An apparatus according to claim 12, further comprising phase adjusting means for adjusting the phase of at least one of said first and said second periodic signals.

15. An apparatus according to claim 12, wherein pilot signals having different frequencies from each other are cyclically recorded, one in each of said many recording tracks; and said first periodic signal forming means is arranged to use said pilot signals as they are reproduced by said reproducing head.

16. An apparatus according to claim 12, wherein each of said tracks on said record bearing medium has video signals of one field recorded thereon.

17. A signal reproducing apparatus, arranged to reproduce from a record bearing medium signals recorded in many recording tracks formed on said medium, comprising:
 (a) a reproducing head arranged to periodically trace said record bearing medium;
 (b) means for producing a tracking error signal which indicates a tracking error between said reproducing head and one of said many recording tracks by using an output of said reproducing head;
 (c) means for forming a first periodic signal corresponding to said tracking error signal;
 (d) means for forming a second periodic signal relative to a tracing period of said reproducing head;
 (e) means for moving said record bearing medium in a direction not parallel with a longitudinal direction of each of said recording tracks;
 (f) detection means for detecting that a phase difference between said first periodic signal and said second periodic signal is within a predetermined range; and
 (g) control means for receiving said tracking error signal and an output of said detection means, and for controlling the movement of said record bearing medium by said moving means by selectively using either of said tracking error signal and the output of said detection means, wherein in a first mode, said control means controls said moving means to decrease said tracking error in response to said tracking error signal, and in a second mode, said control means stops the movement of said record bearing medium by said moving means in response to an output of said detection means.

18. An apparatus according to claim 17, wherein said detection means includes means for periodically generating a first pulse of predetermined width using one of said first and second periodic signals, means for generating a second pulse having a narrower width than said first pulse by using the other of said first and second periodic signals, and gate means for generating said second pulse with said first pulse.

19. An apparatus according to claim 17, wherein said control means stops the movement of said record bearing medium in response to said second pulse gated by said gate means in said second mode.

20. A signal reproducing apparatus, arranged to reproduce from a record bearing medium signals recorded in many recording tracks formed on said medium, comprising:
 (a) a reproducing head arranged to periodically trace said record bearing medium;
 (b) means for producing a tracking error signal which indicates a tracking error between said reproducing head and one of said many recording tracks by using an output of said reproducing head;
 (c) means for forming a first periodic signal corresponding to said tracking error signal;
 (d) means for forming a second periodic signal relative to a tracing period of said reproducing head;
 (e) moving means for moving said record bearing medium in a direction not parallel with a longitudinal direction of each of said recording tracks;
 (f) means for forming a control signal based on phase difference between said first periodic signal and said second periodic signal; and
 (g) control means for receiving said tracking error signal and an output of said detection means, and for controlling the movement of said record bearing medium by said moving means by selectively using either of said tracking error signal or said control signal.

* * * * *